United States Patent [19]

Capdepuy

[11] Patent Number: 4,825,720
[45] Date of Patent: May 2, 1989

[54] WIDE SCAN DRIVE MECHANISM FOR USE IN A VACUUM

[75] Inventor: Marc Capdepuy, Fontenilles, France

[73] Assignee: Alcatel Espace, Courbevoie, France

[21] Appl. No.: 52,826

[22] Filed: May 22, 1987

[30] Foreign Application Priority Data

May 22, 1986 [FR] France ................................ 8607318

[51] Int. Cl.⁴ ............................................ F16H 37/12
[52] U.S. Cl. .......................................... 74/640; 74/468
[58] Field of Search ................. 74/640, 467, 468, 464, 74/DIG. 10; 384/913, 912, 907, 908, 492

[56] References Cited

U.S. PATENT DOCUMENTS

| | | | |
|---|---|---|---|
| 1,697,720 | 1/1929 | Dalton et al. | 74/464 |
| 2,530,767 | 11/1950 | Hamill | 74/461 X |
| 2,906,143 | 3/1955 | Musser | 74/640 |
| 3,075,279 | 1/1963 | Haltner et al. | 384/913 X |
| 3,212,834 | 10/1965 | Mayer et al. | 384/913 X |
| 3,415,143 | 12/1968 | Ishikawa | 74/640 |
| 3,567,504 | 3/1971 | Hopkins et al. | 384/492 X |
| 4,044,274 | 8/1977 | Ohm | 74/640 X |
| 4,096,766 | 6/1978 | Pardo et al. | 74/640 |
| 4,184,380 | 1/1980 | Rivin | 74/464 X |
| 4,227,756 | 10/1980 | Bhushan | 384/913 X |
| 4,315,698 | 2/1982 | Takahashi et al. | 384/908 X |
| 4,317,600 | 3/1982 | Li | 384/492 X |
| 4,508,396 | 4/1985 | Doi et al. | 384/492 X |
| 4,518,308 | 5/1985 | Grzybowski et al. | 74/640 X |
| 4,524,639 | 6/1985 | Carlson | 74/640 |
| 4,666,318 | 5/1987 | Harrison | 384/912 X |
| 4,666,787 | 5/1987 | Bickle et al. | 384/912 X |
| 4,678,952 | 7/1987 | Peterson et al. | 74/640 X |

FOREIGN PATENT DOCUMENTS

| | | | |
|---|---|---|---|
| 2218436 | 10/1973 | Fed. Rep. of Germany | 384/492 |
| 137660 | 8/1984 | Japan | 74/DIG. 10 |
| 781963 | 11/1980 | U.S.S.R. | 74/468 |
| 488590 | 7/1938 | United Kingdom | 384/913 |
| 553351 | 5/1943 | United Kingdom | 384/913 |

OTHER PUBLICATIONS

Antriebstechnik, vol. 25, #4, 1986, pp. 67–69, Mainz, DE: "Einsatz von Harmonic Drive in Fahrantrieben" by F. Mann.
Product Engineering, 2/8/60, pp. 47–51, Chironic, N.: "Innovation in High-Ratio Gearing".

*Primary Examiner*—Dwight G. Diehl
*Attorney, Agent, or Firm*—Sughrue, Mion, Zinn, Macpeak & Seas

[57] ABSTRACT

A wide scan drive mechanism for use in a vacuum, e.g. in space, comprising a motor assembly (20) associated with a gearing device (10) which comprises a drive system via triangular teeth sliding over one another, wherein the various ball bearings and triangular teeth of the gearing device are subjected to dry lubrication treatment.

4 Claims, 2 Drawing Sheets

WIDE SCAN DRIVE MECHANISM FOR USE IN A VACUUM

The present invention relates to a wide scan device capable of pointing various systems (e.g. an antenna or a telescope) in the absence of atmosphere and gravity.

BACKGROUND OF THE INVENTION

In order to provide drive in such an environment, use may be made of a motor designed to operate in a vacuum. The motor drives the load directly and the torque is limited to the motor drive torque.

There also exist speed reduction systems using stepdown gear trains. These systems have the advantage of increasing the drive torque relative to the motor torque. For applications in a vacuum, such as in space, the choice of materials often limits utilizations because of the environmental constraints. Such systems are bulky and of considerable mass.

For applications in the earth's atmosphere, mechanisms including "harmonic drive" gearing can be used. These gearing systems enable considerable speed reductions to be obtained using a single, compact gear train. As a general rule these systems using fluid lubrication, which technology is highly satisfactory in such an environment.

However, in space applications, this technology runs a severe risk of polluting the surrounding parts of the drive mechanism.

Preferred implementations of the invention mitigate this drawback.

SUMMARY OF THE INVENTION

The present invention provides a wide scan drive mechanism for use in a vacuum, the drive mechanism comprising a motor assembly and an associated gearing device including a drive system via triangular teeth sliding over one another, said mechanism inluding the improvement whereby the various ball bearings included in said mechanism and said triangular teeth of said gearing device are subjected to dry lubrication treatments so as to obtain a liftetime greater than about one thousand hours.

Advantageously, such a device provides high performance, in particular by being applicable for lifetimes which exceed one thousand hours.

More precisely, the invention provides a drive mechanism in which said lubrication treatments are provided:
 by means of a coating of sliding varnish;
 by means of a deposit of self-lubricating metals;
 by means of a deposit of solid lubricants; or
 by means of a hard coating.

Advantageously, the mechanism provides a drive mechanism in which the harmonic drive gearing comprises three subassemblies: an elliptical cam coupled to the motor shaft mounted on ball bearings; a circular ring fixed to a support assembly; and a flexible ring driving an outlet shaft which is likewise mounted on ball bearings.

BRIEF DESCRIPTION OF THE DRAWINGS

An embodiment of the invention is described by way of example with reference to the accompanying drawings, in which.

MORE DETAILED DESCRIPTION

Figure 1:
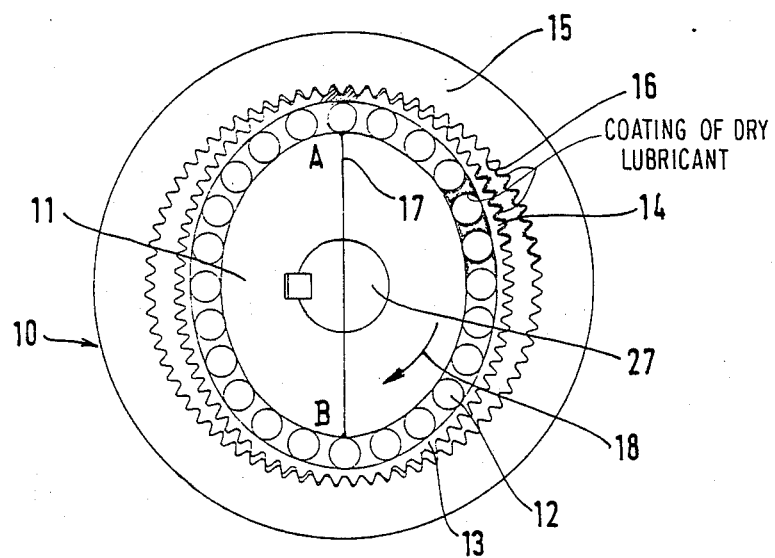
FIGS. 1 and 2 are diagrams for illustrating the operation of harmonic drive gearing.
Figure 2:
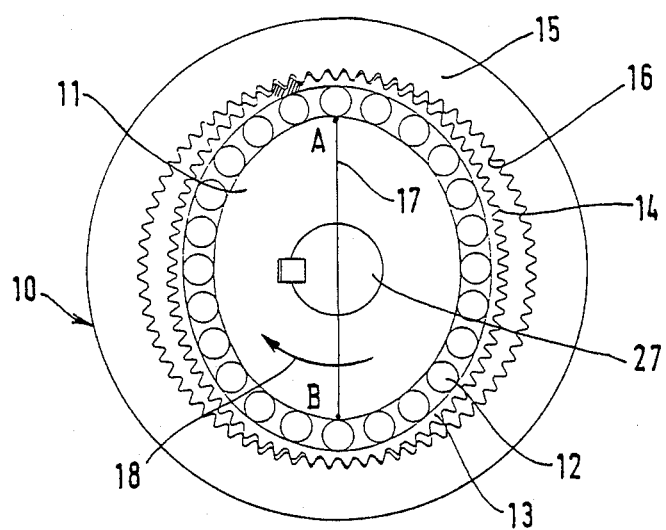

The harmonic drive gearing shown in FIGS. 1 and 2 comprises three components:
 an elliptical cam 11 which guarantees high efficiency transmission by virtue of its ball bearing 12;
 a flexible ring 13 having outside teeth 14 and deformed, in operation, by the cam 11; and
 a rigid ring 15 having inside teeth 16 at the same pitch as the teeth on the flexible ring, but having two more teeth overall.

The ring 15 meshes continually with the teeth 14 of the flexible ring 13 on the major axis 17 (AB) of the ellipse of the cam 11. About 15% of the teeth in the two rings 13 and 14 are permanently in contact.

Because of the different numbers of teeth on the two rings 13 and 15, their undisturbed diameters differ in the same ratio, and rotation 18 of the elliptical cam 11 causes relative movement to take place between the rings 13 and 15.

FIGS. 1 and 2 show one version of such harmonic drive gearing before and after one complete turn through 360° by the shaft 27 of the elliptical cam 11. In this case, the flexible ring 13 is displaced by two teeth relative to the rigid ring 15 and in the opposite direction to the direction of rotation 18.

Figure 3:
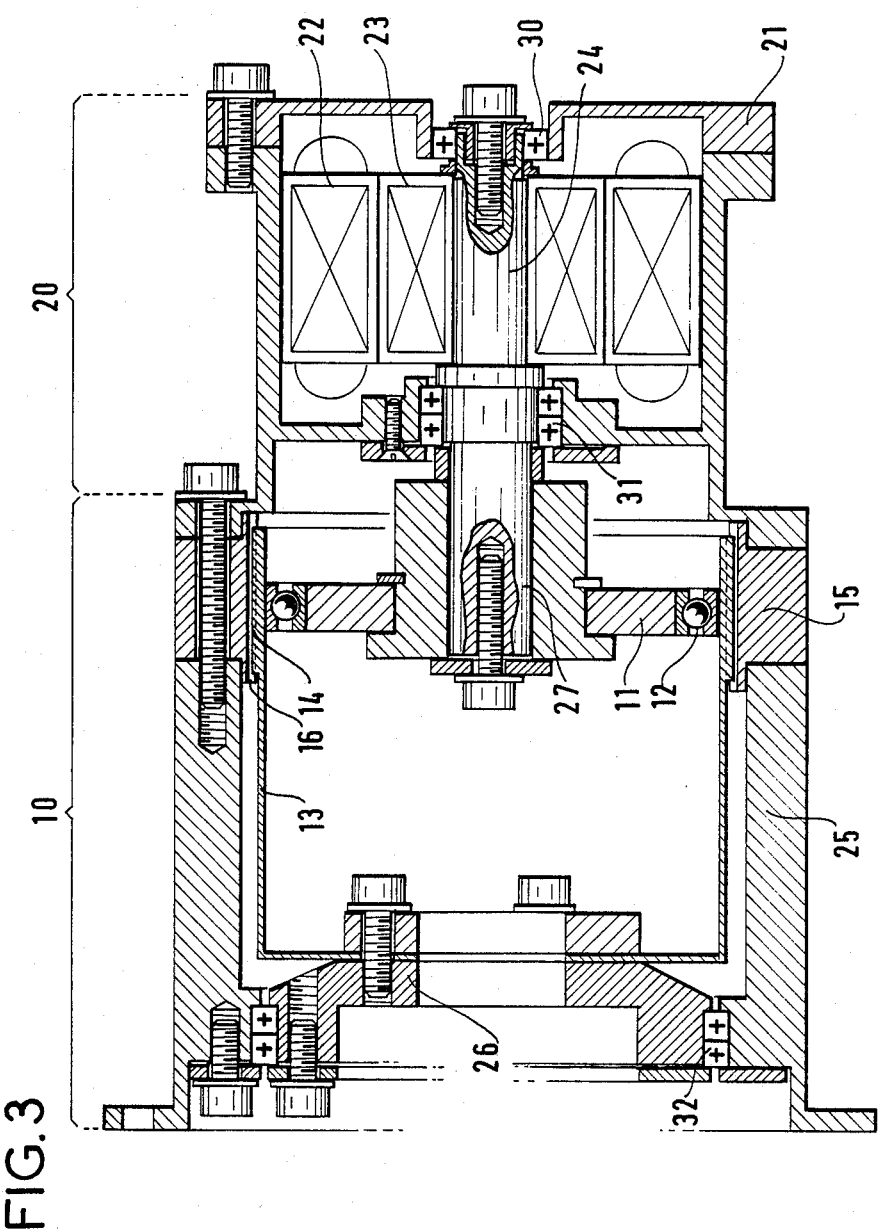
FIG. 3 shows a drive mechanism used in the invention.

The drive mechanism shown in FIG. 3 comprises:
 a motor assembly 20 comprising a motor housing 21 containing a stator 22, a rotor 23, and a drive shaft 24;
 a harmonic drive gear 10 of the kind shown in FIGS. 1 and 2 comprising three subassemblies, namely the elliptical cam 11, the circular ring 15, and the flexible ring 13;
 a support assembly 25 fixed to the circular ring 15; and
 an outlet shaft 26 having the same axis of rotation as the drive shaft 24 but driven by the flexible ring 13.

Various ball bearings facilitate rotation of the drive shaft 24 coupled to the shaft 27 of the elliptical cam, i.e. a ball bearing 30 and a prestressed ball bearing assembly 31; and the outlet shaft 26 runs in paired bearings 32.

The present invention relates to such a wide scan drive mechanism comprising a motor assembly 20 associated with a harmonic drive gear 10. The elliptical cam 11 is coupled to the motor shaft 24 which is mounted on ball berings, the circular ring 15 is fixed to the supporting assembly, and the flexible ring 13 driving the outlet shaft 26 is likewise mounted on ball bearings, with the entire assemby using dry lubricating means, i.e. a dry lubricant, FIG. 1, illustrated as applied only to part of the assembly parts, although in reality applied over all of these parts having the advantage of using materials that do not outgas in a vacuum, and that thus avoid any danger of polluting the surrounding parts of the mechanism in a space application. The circular ball bearings 30, 31, and 32, and the oval ball bearing 12 are lubricated by deposits of solid lubricants. The teeth of the circular ring 15 and of the flexible ring 13 are lubricated in one of the following ways:
 a coating of a sliding varnish, i.e. a varnish having a low coefficient of friction;
 deposits of soft self-lubricating metals;
 deposits of solid lubricants; or
 hard coatings.

The original nature of the invention lies in the association of a particular mechanism and dry lubrication methods, thereby providing a potential lifetime of several thousands of hours.

This invention has the advantage of using mechanical drive systems including a motor and stepdown gearing made of materials of space quality (no outgassing).

In addition, it uses lubricating means suitable for operation in a vacuum. All of the ball bearings are lubricated by using a deposit of a solid lubricant on the balls and the ball-races. The most suitable solid materials for this method are molybdenum bisulfide $MoS_2$, and lead as a self-lubricating metal.

The teeth of the circular ring 15 and of the flexible ring 13 of the gearing may be lubricated by having materials coated thereon. The methods best adapted to operation in a vacuum including a coating of polytetrafluoroethylene (PTFE) constituting a sliding varnish, which enables sufficiently high forces to be transmitted without degrading the materials that come into contact, and while still allowing high accuracy to be achieved.

Thus, the elliptical cam 11 has an elliptical ball bearing 12 using dry lubrication suitable to operation in a space environment. The other ball bearings are circular and serve as support bearings for the drive shafts. They use the same type of lubrication as the elliptical bearing 12. The teeth of the rings 13 and 15 are subjected to a self-lubricating treatment suitable for operating in a vacuum, which treatment consists in depositing PTFE thereon to a thickness of a few micrometers. Such lubricating means have the advantage of avoiding the drawbacks associated with fluid lubrication in a vacuum, and in particular the problems related to sealing.

In the space environment or in an ultra-high vacuum, metal parts tend to weld together by molecular diffusion. Interposing self-lubricating material between said parts avoids this phenomenon.

Naturally, the present invention has been described solely by way of preferred example and its component parts could be replaced by equivalent parts without thereby going beyond the scope of the invention.

A system may be interposed between the harmonic drive gearing and the motor for aligning the axes of the motor and of the elliptical cam, for example a Holdam joint.

In order to verify the position of the outlet shaft, a coding system may be mounted on said shaft.

When information is to be passed, for example when used in conjunction with a wide scan antenna, a cable winder may be mounted on the outlet shaft.

In order to provide a speed feedback loop, a tachometer generator may be associated with the above-described drive mechanism.

The harmonic drive gearing may also be used flat.

What is claimed is:

1. A wide scan drive mechanism for use in a space vacuum conditions, said drive mechanism comprising a motor assembly and an associated gearing device providing drive via triangular teeth sliding over one another, said drive mechanism including the improvement wherein said associated gearing device has ball bearings consisting of balls confined between ball-races and wherein the balls and ball-races are coated with a dry lubricant consisting of a deposit of solid lubricant and said triangular teeth are coated with a dry lubricant sliding varnish having a low coefficient of friction such that the dry lubricant sliding varnish enables sufficiently high forces to be transmitted between the gear teeth without degrading the contacting materials of the associated gearing device while allowing high accuracy, and the dry lubricating sliding varnish and said deposit of solid lubricant prevents the metals parts in contact with each other from welding together by molecular diffusion while avoiding the danger of polluting the surrounding parts of the mechanism in such space application.

2. A drive mechanism according to claim 1, wherein said dry lubricating sliding varnish is Polytetrafluoroethylene (PTFE).

3. A drive mechanism according to claim 1 wherein said deposit of solid lubricant is one material of the group consisting of $MoS_2$ and lead.

4. A drive mechanism according to claim 1, wherein said gearing device is a harmonic drive gearing device comprising three subassemblies: an elliptical cam coupled to a drive shaft mounted on ball bearings; a circular ring fixed to a support assembly; and a flexible ring driving an outlet shaft also mounted on ball bearings.

* * * * *